United States Patent
Griffin et al.

(10) Patent No.: US 11,979,291 B1
(45) Date of Patent: May 7, 2024

(54) CLUSTER BOUNDARY ENFORCER SERVICE

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/974,906

(22) Filed: Oct. 27, 2022

(51) Int. Cl.
*G06F 15/16* (2006.01)
*H04L 41/0803* (2022.01)
*H04L 41/0894* (2022.01)

(52) U.S. Cl.
CPC ...... *H04L 41/0894* (2022.05); *H04L 41/0803* (2013.01)

(58) Field of Classification Search
CPC .................. H04L 41/0894; H04L 41/0803
USPC ......................................................... 709/220
See application file for complete search history.

(56) References Cited

U.S. PATENT DOCUMENTS

| | | | | |
|---|---|---|---|---|
| 5,619,716 A * | 4/1997 | Nonaka | ...................... | G06F 8/65 713/1 |
| 6,006,269 A * | 12/1999 | Phaal | ...................... | H04L 43/00 709/227 |
| 6,029,196 A * | 2/2000 | Lenz | ...................... | H04L 9/40 709/221 |
| 6,286,038 B1 * | 9/2001 | Reichmeyer | ........ | H04L 41/0883 709/222 |
| 7,072,956 B2 | 7/2006 | Parupudi et al. | | |
| 7,317,712 B2 * | 1/2008 | Ishimura | ............. | H04L 63/0428 713/153 |
| 7,602,748 B2 * | 10/2009 | Sinnreich | ............ | H04L 12/2854 455/437 |
| 8,116,679 B2 * | 2/2012 | Dunko | .................. | H04W 12/50 455/41.1 |
| 8,443,106 B2 * | 5/2013 | Shuster | .................... | H04L 63/10 709/225 |
| 8,577,998 B2 * | 11/2013 | Ver Steeg | ............. | H04L 63/107 370/254 |
| 8,645,976 B2 * | 2/2014 | Gautam | ............... | H04N 21/414 709/227 |
| 9,374,352 B2 * | 6/2016 | Shuster | ................. | H04L 63/105 |
| 9,705,867 B2 * | 7/2017 | Shuster | ................... | H04L 63/08 |

(Continued)

OTHER PUBLICATIONS

Author Unknown, "Securing a Cluster—Kubernetes," https://kubernetes.io/docs/tasks/administer-cluster/securing-a-cluster/, Accessed Aug. 9, 2022, 5 pages.

(Continued)

*Primary Examiner* — Alicia Baturay
(74) *Attorney, Agent, or Firm* — Dority & Manning, P.A.

(57) ABSTRACT

A server device that is configured to provide service to client devices in a second geographic zone determines that a client device is transitioning from a first geographic zone to the second geographic zone. The server device receives a client device manifest that identifies a configuration of the client device. Based on the client device manifest, the server device determines that the configuration of the client device does not match a policy of the second geographic zone. The server device sends to the client device instructions that, if performed by the client device, will cause the configuration of the client device to match the policy of the second geographic zone.

20 Claims, 7 Drawing Sheets

(56) References Cited

U.S. PATENT DOCUMENTS

| | | | |
|---|---|---|---|
| 9,722,857 B2 | 8/2017 | Liu | |
| 9,838,390 B2 * | 12/2017 | Zakaria | H04W 4/70 |
| 9,843,624 B1 * | 12/2017 | Taaghol | H04L 41/0895 |
| 9,960,921 B2 | 5/2018 | Leighton et al. | |
| 10,333,985 B2 | 6/2019 | Pulapaka et al. | |
| 10,440,122 B2 * | 10/2019 | Brickell | H04W 4/80 |
| 10,887,398 B2 * | 1/2021 | Brickell | H04L 67/10 |
| 10,977,277 B2 | 4/2021 | Merriman et al. | |
| 11,057,379 B2 * | 7/2021 | Chung | H04W 12/50 |
| 11,102,165 B2 * | 8/2021 | Deshpande | H04L 61/4511 |
| 11,343,321 B2 * | 5/2022 | Brickell | H04L 67/10 |
| 11,477,160 B2 * | 10/2022 | Deshpande | H04L 61/5007 |
| 2005/0050174 A1 * | 3/2005 | Kung | H04L 67/34 |
| | | | 709/220 |
| 2005/0190734 A1 * | 9/2005 | Khalil | H04W 8/04 |
| | | | 370/338 |
| 2008/0043689 A1 | 2/2008 | Walter | |

OTHER PUBLICATIONS

Author Unknown, "Oracle® Fusion Middleware Administering Web Services—Managing Application Migration Between Environments," Oracle, 2015, 8 pages.

* cited by examiner

CLUSTER BOUNDARY ENFORCER SERVICE

BACKGROUND

Networks may be divided into geographic environments with different policies for devices to comply with in order to obtain service in the environment. The environment policy may limit which devices can transition into the geographic environment based on the configuration of the device.

SUMMARY

The examples disclosed herein implement a cluster boundary enforcer service. The service acts as a gateway between environments in a network to allow or deny devices access to an environment based on an environment policy and configuration of the devices. The service can instruct a device on how to be configured in order to gain access to an environment, allowing for dynamic updates to a device that are specific to an environment.

In one example, a method is provided. The method includes determining, by a server device that is configured to provide service to client devices in a second geographic zone, that a client device is transitioning from a first geographic zone to the second geographic zone. The method further includes receiving, by the server device, a client device manifest that identifies a configuration of the client device. The method further includes determining, by the server device based on the client device manifest, that the configuration of the client device does not match a policy of the second geographic zone. The method further includes sending, by the server device to the client device, instructions that, if performed by the client device, will cause the configuration of the client device to match the policy of the second geographic zone.

In another example, a server device is provided. The server device includes a memory and a processor device coupled to the memory. The processor device is to determine that a client device is transitioning from a first geographic zone to the second geographic zone. The processor device is further to receive a client device manifest that identifies a configuration of the client device. The processor device is further to determine that the configuration of the client device does not match a policy of the second geographic zone. The processor device is further to send instructions that, if performed by the client device, will cause the configuration of the client device to match the policy of the second geographic zone.

In another implementation, a non-transitory computer-readable storage medium is provided. The non-transitory computer-readable storage medium includes computer-executable instructions to cause a processor device to determine that a client device is transitioning from a first geographic zone to the second geographic zone. The instructions further cause the processor device to receive a client device manifest that identifies a configuration of the client device. The instructions further cause the processor device to determine that the configuration of the client device does not match a policy of the second geographic zone. The instructions further cause the processor device to send instructions that, if performed by the client device, will cause the configuration of the client device to match the policy of the second geographic zone.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Networks may be divided into multiple geographic environments. Devices or services in the network may transition between the environments. Each environment may have policies that indicate a configuration for the device or service to match in order to obtain access to the environment. For instance, each environment may have a specific purpose or security profile. Devices and services frequently wish to transition between environments, presenting challenges in determining what happens when a device or service enters a new environment with a configuration that does not match the environment policy.

The cluster boundary enforcer service can act as a gateway service that resides on the boundary between two environments (e.g., two geographic clusters or zones). The cluster boundary enforcer service may be invoked when a device or service desires to move from one environment to another environment in the network. The cluster boundary enforcer service may permit or deny the device or service access to the new environment. For example, the device or service may want to be promoted from staging to production, or the device or service may want to move from one geographical cluster to another geographical cluster. The cluster boundary service can compare the requirements for the new environment to the current configuration of the device or service that desires to move to the new environment. If the device or service does not have the configuration required to access the new environment, the cluster boundary service can prepare the device or service to transition by sending instructions to the device or service. Performing the instructions can cause the device or service to make changes that allow the device or service to meet the requirements of the new environment.

In order for the cluster boundary enforcer service to determine whether the device or service meets the requirements for access in the new environment, a manifest exchange may occur. The manifest exchange allows for information to be sent between the transitioning device or service and the cluster boundary enforcer service, such as the configuration of the device or service and the requirements for entering the new environment.

Non-limiting example implementations of the cluster boundary enforcer service may include a user with a mobile device, a vehicle, or an autonomous vehicle traveling from one geographic area to another geographic area. The cluster boundary enforcer service may be deployed between the two geographic areas and determine that the mobile device or vehicle is transitioning between geographic areas which have different rules. The cluster boundary enforcer service can prepare the mobile device or vehicle to transition to the new geographic area by sending instructions to the mobile device or vehicle that detail steps the mobile device or vehicle can take in order to comply with the rules and enter the new geographic area.

Figure 1:
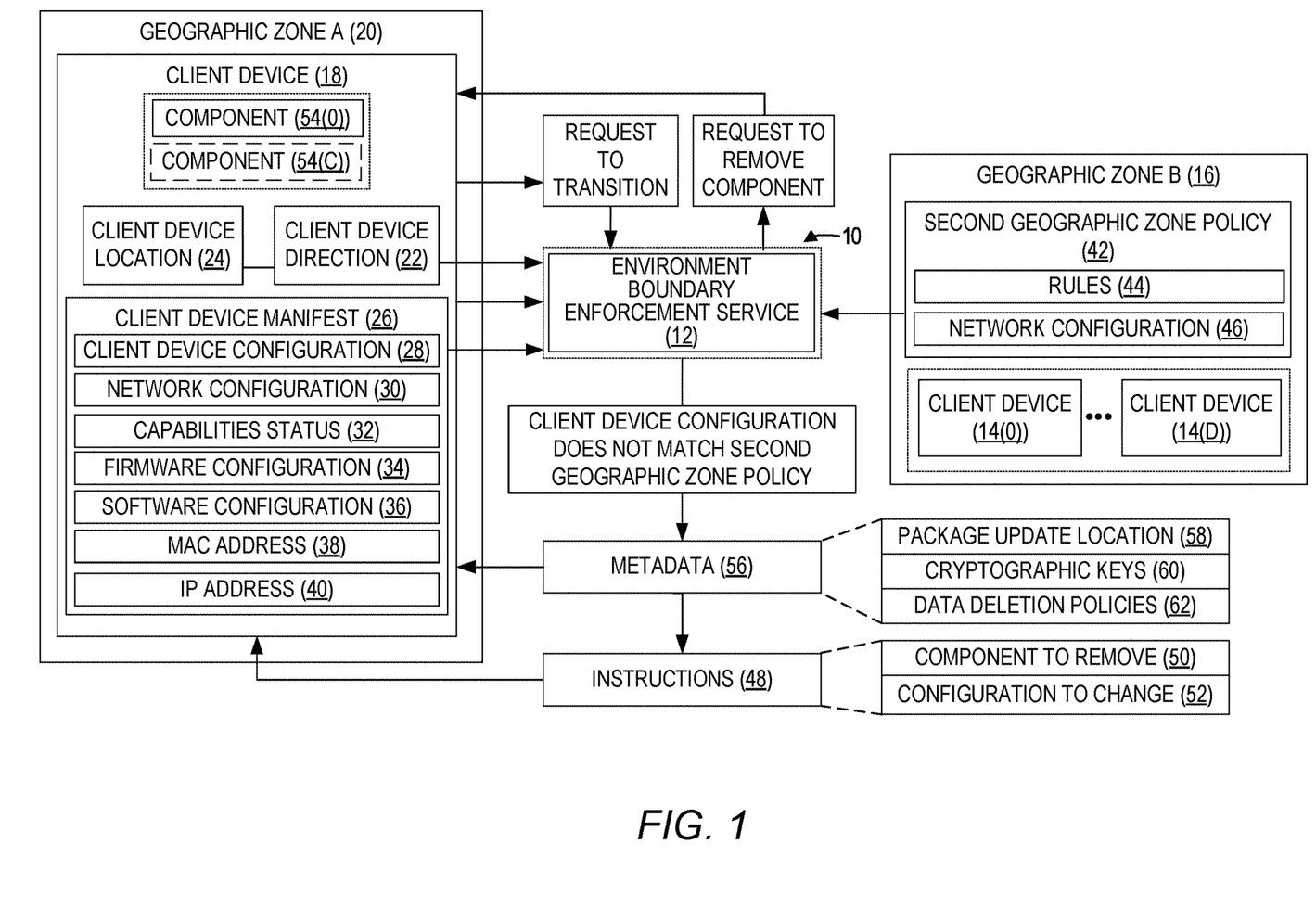
FIG. 1 is a block diagram of a server device in which examples of a cluster boundary enforcer service may be practiced.

FIG. 1 is a block diagram of a server device 10 in which examples of a cluster boundary enforcer service may be practiced. It is to be understood that the server device 10 in some examples may include constituent elements in addition to those illustrated in FIG. 1. In the example of FIG. 1, the server device 10 implements an environment boundary enforcement service 12 that performs cluster boundary enforcement.

The environment boundary enforcement service 12 is configured to provide service to client devices 14(0)-14(D) in a second geographic zone 16. The environment boundary enforcement service 12 may determine that a client device 18 in a first geographic zone 20 is transitioning from the first geographic zone 20 to the second geographic zone 16. The client device 18 may comprise of a computing device (e.g., a laptop, a mobile phone), a service, or another node in a network, as non-limiting examples. In one example, the environment boundary enforcement service 12 may receive a request from the client device 18 that indicates that the client device 18 wants to transition from the first geographic zone 20 to the second geographic zone 16. In another example, the environment boundary enforcement service 12 may track a client device direction 22 and a client device location 24. Based on the client device direction 22 and the client device location 24, the environment boundary enforcement service 12 can determine that the client device 18 is preparing to transition from the first geographic zone 20 to the second geographic zone 16. The client device direction 22 and client device location 24 may be determined based on components in the client device 18, such as accelerometers and compasses. For example, the client device direction 22 may be pointed towards the second geographic zone 16 and the current client device location 24 may be closer in proximity to the second geographic zone 16 than the first geographic zone 20. Such a client device direction 22 and client device location 24 may notify the environment boundary enforcement service 12 that the client device 18 is preparing to transition from the first geographic zone 20 to the second geographic zone 16.

The environment boundary enforcement service 12 may receive a client device manifest 26 that identifies a client device configuration 28. The client device manifest 26 may include one or more of a client device configuration 28, a network configuration 30, a capabilities status 32, a firmware configuration 34, a software configuration 36, a MAC address 38, and an IP address 40 of the client device 18.

Based on the client device manifest 26, the environment boundary enforcement service 12 can determine that the client device configuration 28 does not match a second geographic zone policy 42. For example, the second geographic zone policy 42 may state requirements for a client device 18 to enter the second geographic zone 16 or participate in the second geographic zone 16, such as data policies to comply with or versions of software to install on the client device 18. In another example, the second geographic zone policy 42 may specify the cryptographic software, cryptographic keys, or encryption to be performed by devices in the second geographic zone 16. In another implementation, the environment boundary enforcement service 12 can determine that one or more of the network configuration 30, the capabilities status 32, the firmware configuration 34, the software configuration 36, the MAC address 38, or the IP address 40 of the client device 18 do not match the second geographic zone policy 42. For example, the software configuration 36 of the client device 18 may indicate that the client device 18 software is running on a version that is older than a version that is acceptable in the second geographic zone 16. In another example, the MAC address 38 or the IP address 40 of the client device 18 may not match the second geographic zone policy 42 and are to be changed in order for the client device 18 to access the second geographic zone 16.

The second geographic zone policy 42 may include one or more rules 44 that govern entry and participation of the client device 18 in the second geographic zone 16. The second geographic zone policy 42 may include a network configuration 46 of the second geographic zone 16. For example, the rules 44 may indicate that personal identifiable information on the client device 18 is to be encrypted or removed from the client device 18 in order for the client device 18 to enter or obtain service in the second geographic zone 16. In another instance, the rules 44 may be performance-based rules. In another example, the network configuration 46 of the second geographic zone 16 may specify that the second geographic zone 16 is a 5 GHz network, while the network configuration 30 of the client device 18 only allows the client device 18 to operate on a 2.4 GHz network.

The environment boundary enforcement service 12 may determine that the client device configuration 28 does not match the second geographic zone policy 42 by evaluating the differences between the client device manifest 26 and the second geographic zone policy 42. For example, the environment boundary enforcement service 12 may be protecting the second geographic zone 16. The environment boundary enforcement service 12 may analyze the client device manifest 26 of the client device 18 in the first geographic zone 20 and perform a diff based on the requirements of the second geographic zone 16 (e.g., the second geographic zone policy 42).

The environment boundary enforcement service 12 can send instructions 48 to the client device 18. If the instructions 48 are performed by the client device 18, then the client device configuration 28 can be changed to match the second geographic zone policy 42. In another implementation, if the instructions 48 are performed by the client device 18, then one or more of the network configuration 30, the capabilities status 32, the firmware configuration 34, the software configuration 36, the MAC address 38, or the IP address 40 will match the second geographic zone policy 42. As a result of performing the instructions 48, the client device 18 matches the second geographic zone policy 42 and may be permitted to enter or obtain service in the second geographic zone 16. For example, the software configuration 36 may indicate that the software or operating system on the client device 18 is an old version that is not supported in the second geographic zone 16. If the client device 18 performs the instructions 48 to update the software or operating system, then the software configuration 36 of the client device 18 can match the second geographic zone policy 42 and the client device 18 may be permitted to enter or obtain service in the second geographic zone 16.

The instructions 48 may identify one or more of a component to remove 50 from the client device 18 or a configuration to change 52 on the client device 18 for the client device to be permitted to enter or obtain service in the second geographic zone 16. For example, the instructions 48 may instruct one or more components in a plurality of components 54(0)-54(C) on the client device 18 to be removed from the client device 18. The client device 18 may send a request to the environment boundary enforcement service 12 to remove one or more components 54(0)-54(C) from the client device 18. The environment boundary enforcement service 12 may receive the request. In response, the client device 18 may remove the one or more components 54(0)-54(C) from the client device 18. As a result, the client device 18 may be permitted to enter or obtain service in the second geographic zone 16. In another example, the instructions 48 may instruct the client device 18 to remove personal identifiable information from the client device 18. The client device 18 may send a request to the environment boundary enforcement service 12 to remove the personal identifiable information from the client device 18. The environment boundary enforcement service 12 may receive the request, the client device 18 may remove the personal identifiable information from the client device 18, and the client device 18 may be permitted to enter or obtain service in the second geographic zone 16.

When sending the instructions 48 to the client device 18, the environment boundary enforcement service 12 may send metadata 56 to the client device 18. The metadata 56 may include one or more of a local package update location 58, cryptographic keys 60, and one or more data deletion policies 62. For example, the metadata 56 may indicate particular data to remove from the client device 18 in order for the environment boundary enforcement service 12 to allow the client device 18 access to the second geographic zone 16. The metadata 56 may identify persistent volumes for storage of data that cannot leave the current environment (e.g., the first geographic zone 20). In another example, the metadata 56 may detail the cryptographic keys that the client device 18 requires in order to enter or obtain service in the second geographic zone 16.

Figure 2:
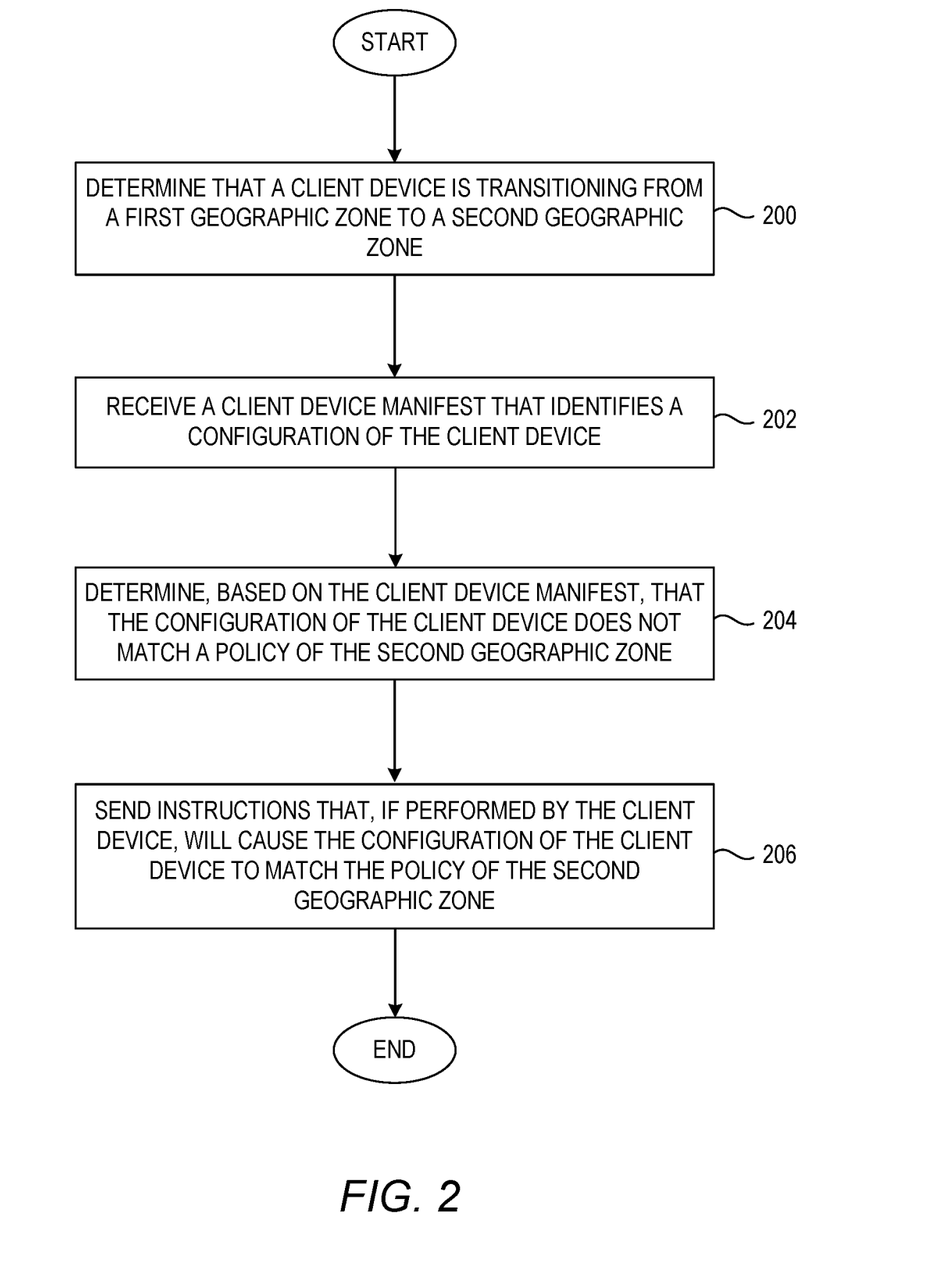
FIG. 2 is a flowchart illustrating operations performed by the server device of FIG. 1 for a cluster boundary enforcer service, according to one example.

FIG. 2 is a flowchart illustrating operations performed by the server device of FIG. 1 for a cluster boundary enforcer service, according to one example. Elements of FIG. 1 are referenced in describing FIG. 2 for the sake of clarity. In FIG. 2, operations begin with a processor device of a server device, such as the processor device of the server device 10 of FIG. 1, determining that a client device 18 is transitioning from a first geographic zone 20 to a second geographic zone 16 (block 200).

The processor device then receives a client device manifest 26 that identifies a configuration 28 of the client device 18 (block 202).

The processor device then determines, based on the client device manifest 26, that the configuration 28 of the client device does not match a policy 42 of the second geographic zone 16 (block 204).

The processor device then sends instructions 48 that, if performed by the client device 18, will cause the configuration 28 of the client device 18 to match the policy 42 of the second geographic zone (block 206).

Figure 3:
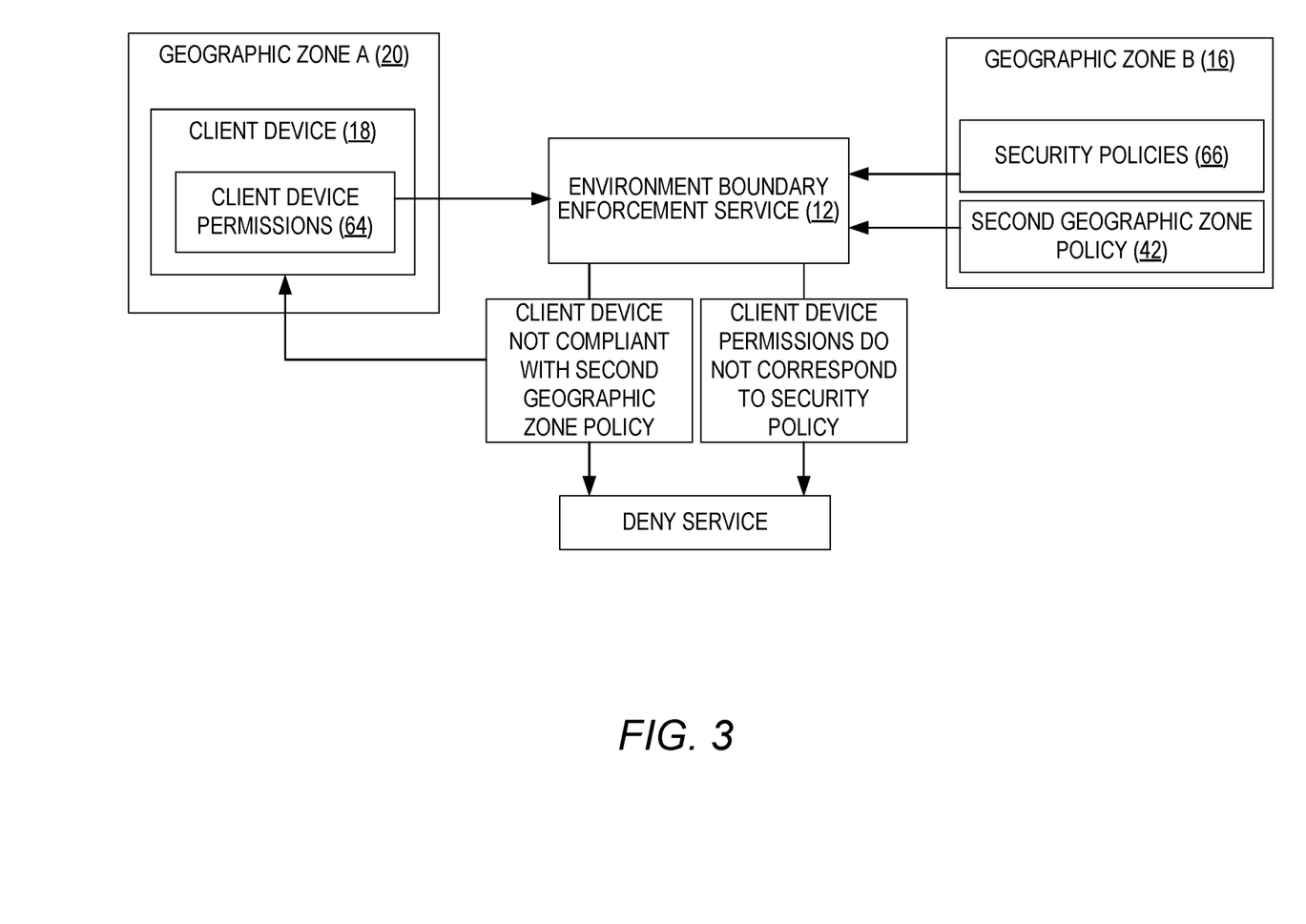
FIG. 3 is a simpler block diagram of the server device of FIG. 1 for a cluster boundary enforcer service, according to one example.

FIG. 3 is a simpler block diagram of the server device of FIG. 1 for a cluster boundary enforcer service, according to one example. Elements of FIG. 1 are referenced in describing FIG. 3 for the sake of clarity. In the example of FIG. 3, the environment boundary enforcement service 12 may determine that client device permissions 64 of the client device 18 in the first geographic zone 20 do not correspond to one or more security policies 66 of the second geographic zone 16. For example, security policies 66 may state acceptable encryption to be used by devices, such as the client device 18, anti-virus guidelines, or password protection policies, as non-limiting examples, in order to be permitted access to the second geographic zone 16. As a result, the environment boundary enforcement service 12 may deny the client device 18 from entering or obtaining service in the second geographic zone 16 if the client device 18 does not meet the security policies 66. In another example, the environment boundary enforcement service 12 may send to the client device 18 in the first geographic zone 20 an indication that the client device 18 is not compliant with the second geographic zone policy 42 of the second geographic zone 16. As a result, the environment boundary enforcement service 12 may deny the client device 18 from entering or obtaining service in the second geographic zone 16.

Figure 4:
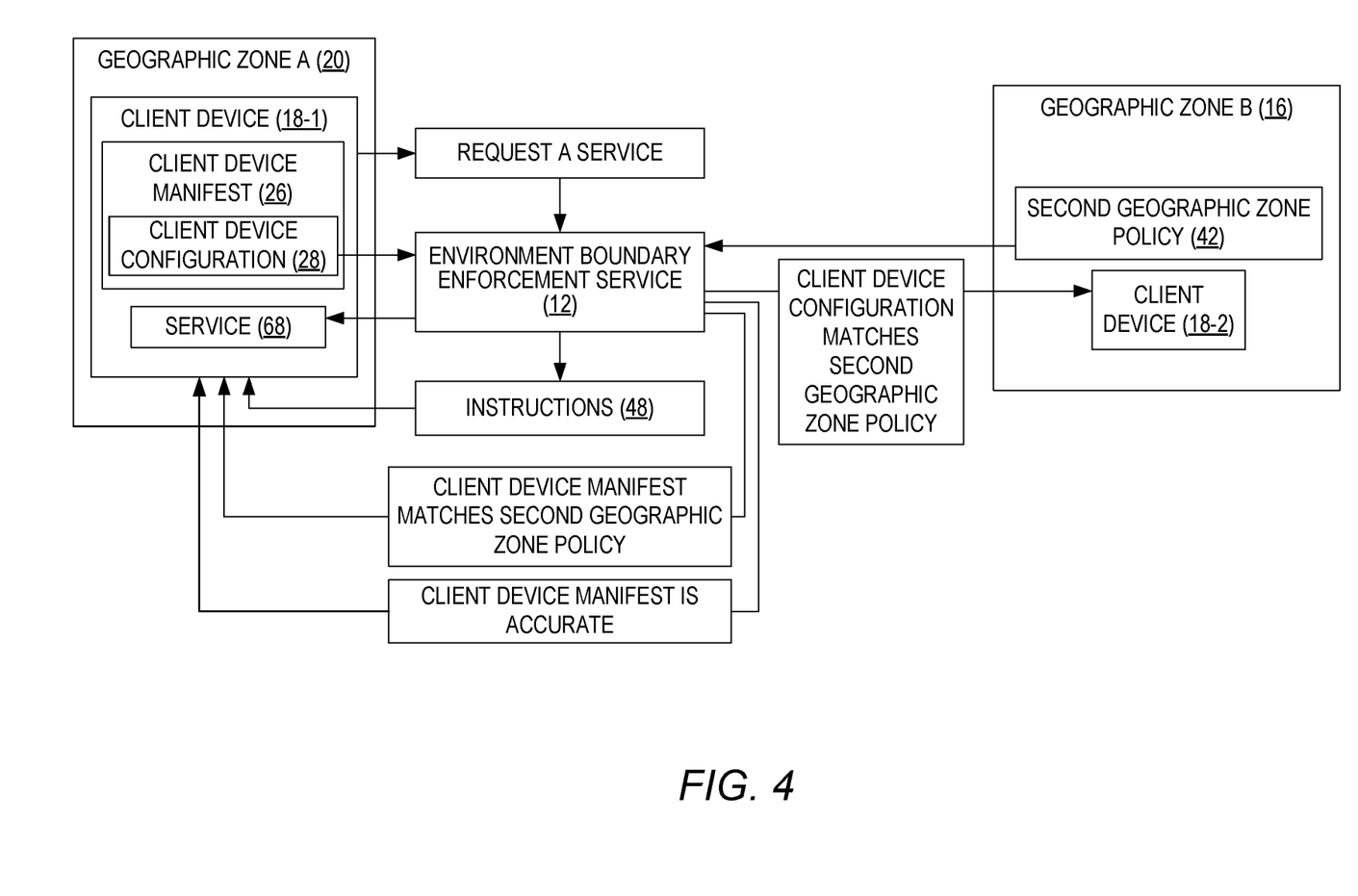
FIG. 4 is a simpler block diagram of the server device of FIG. 1 for a cluster boundary enforcer service, according to one example.

FIG. 4 is a simpler block diagram of the server device of FIG. 1 for a cluster boundary enforcer service, according to one example. Elements of FIG. 1 are referenced in describing FIG. 4 for the sake of clarity. In the example of FIG. 4, the environment boundary enforcement service 12 may validate that the client device manifest 26 of the client device 18-1 in the first geographic zone 20 correctly identifies the client device configuration 28. The environment boundary enforcement service 12 can then send to the client device 18-1 in the first geographic zone 20 a communication that the client device manifest 26 is accurate. As a result, the environment boundary enforcement service 12 may accept the client device manifest 26 of the client device 18-1 in the first geographic zone 20. In another example, the environment boundary enforcement service 12 may validate that the client device manifest 26 of the client device 18-1 in the first geographic zone 20 correctly identifies one or more of the network configuration 30, the capabilities status 32, the firmware configuration 34, the software configuration 36, the MAC address 38, or the IP address 40. The environment boundary enforcement service 12 can then send to the client device 18-1 in the first geographic zone 20 a communication that the client device manifest 26 is accurate. As a result, the environment boundary enforcement service 12 may accept the client device manifest 26 of the client device 18-1 in the first geographic zone 20. In another instance, the environment boundary enforcement service 12 may validate that the client device manifest 26 of the client device 18-1 in the first geographic zone 20 correctly identifies the client device configuration 28 after an update to the client device 18.

In another example, the environment boundary enforcement service 12 may receive a request for a service 68 from the client device 18-1 in the first geographic zone 20. In response to the request for the service 68, the environment boundary enforcement service 12 may provide the service 68 to the client device 18-1. The environment boundary enforcement service 12 may store the latest versions of key services (e.g., the service 68) required for access to the second geographic zone 16. For example, the environment boundary enforcement service 12 may instruct the client device 18-1 in the first geographic zone 20 to install the service 68 in order to be granted permission to enter or obtain service in the second geographic zone 16. The client device 18-1 may then request the service 68 from the environment boundary enforcement service 12 and the environment boundary enforcement service 12 may provide the service 68 to the client device 18-1. The client device 18 can then install and execute the service 68 on the client device 18-1. As a result, the client device 18-1 may transition from the first geographic zone 20 and enter or obtain service in the second geographic zone 16. The service 68 may be a keep-alive service or a message bus service, as non-limiting examples. Providing the latest versions of services, such as the service 68, on the environment boundary enforcement service 12 allows for the services and the client devices to be modified in a manner that is specific to the environment being enforced (e.g., the second geographic zone 16).

In another example, the environment boundary enforcement service 12 may receive from the client device 18-1 in the first geographic zone 20 an updated client device manifest 26 after the environment boundary enforcement service 12 sends instructions 48 to the client device 18-1. The environment boundary enforcement service 12 may determine that the updated client device manifest 26 matches the second geographic zone policy 42. The environment boundary enforcement service 12 may send a communication to the client device 18-1 that the updated client device manifest 26 matches the second geographic zone policy 42. For example, the client device 18-1 may install the service 68 after sending a request to the environment boundary enforcement service 12 for the service 68 and receiving the service 68 from the environment boundary enforcement service 12. The client device 18-1 may then update the client device manifest 26 to indicate that service 68 is installed and running on the client device 18-1. The client device 18-1 may send the updated client device manifest 26 to the environment boundary enforcement service 12 to determine whether the updated client device manifest 26 matches the second geographic zone policy 42.

In another example, the environment boundary enforcement service 12 may determine that the client device configuration 28 matches the second geographic zone policy 42 based on the client device manifest 26. In response to determining that the client device configuration 28 matches the second geographic zone policy 42, the environment boundary enforcement service 12 can provide the client device 18-1 with service in the second geographic zone 16 (e.g., client device 18-2). In another example, the environment boundary enforcement service 12 may determine that one or more of the network configuration 30, the capabilities status 32, the firmware configuration 34, the software configuration 36, the MAC address 38, or the IP address 40 matches the second geographic zone policy 42 based on the client device manifest 26. In response, the environment boundary enforcement service 12 can provide the client device 18-1 with service in the second geographic zone 16 (e.g., client device 18-2).

Figure 5:
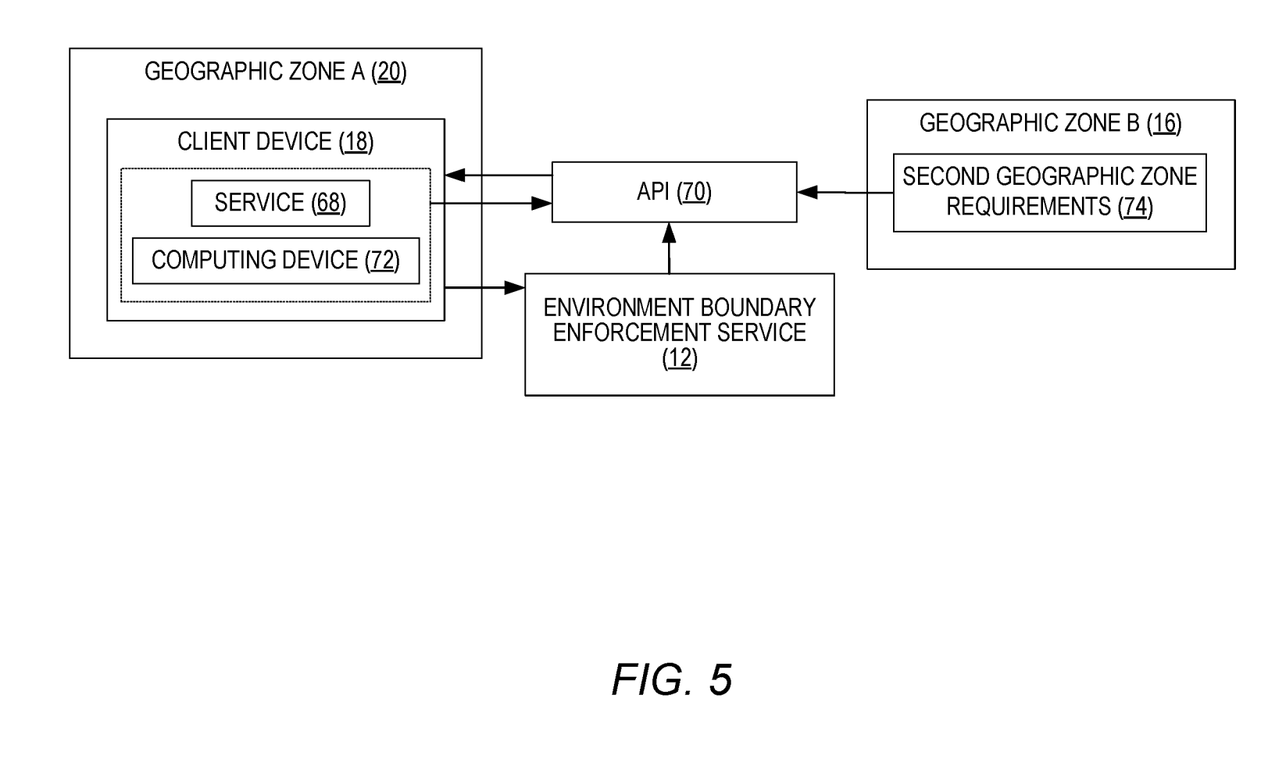
FIG. 5 is a simpler block diagram of the server device of FIG. 1 for a cluster boundary enforcer service, according to one example.

FIG. 5 is a simpler block diagram of the server device of FIG. 1 for a cluster boundary enforcer service, according to one example. Elements of FIG. 1 are referenced in describing FIG. 5 for the sake of clarity. In the example of FIG. 5, the environment boundary enforcement service 12 may provide an application programming interface (API) 70 to the client device 18 in the first geographic zone 20. The environment boundary enforcement service 12 may determine that the service 68 or a computing device 72 are a prospective service or computing device that is transitioning from the first geographic zone 20 to the second geographic zone 16. The environment boundary enforcement service 12 may allow the service 68 or the computing device 72 to interface with the API 70. In interfacing with the API 70, the environment boundary enforcement service 12 may determine that the service 68 or the computing device 72 meets second geographic zone requirements 74 to permit the service 68 or the computing device 72 to enter or obtain service in the second geographic zone 16. Alternatively, in interfacing with the API 70, the environment boundary enforcement service 12 may determine that the service 68 or the computing device 72 does not meet the second geographic zone requirements 74 and deny the service 68 or the computing device 72 to enter or obtain service in the second geographic zone 16.

Figure 6:
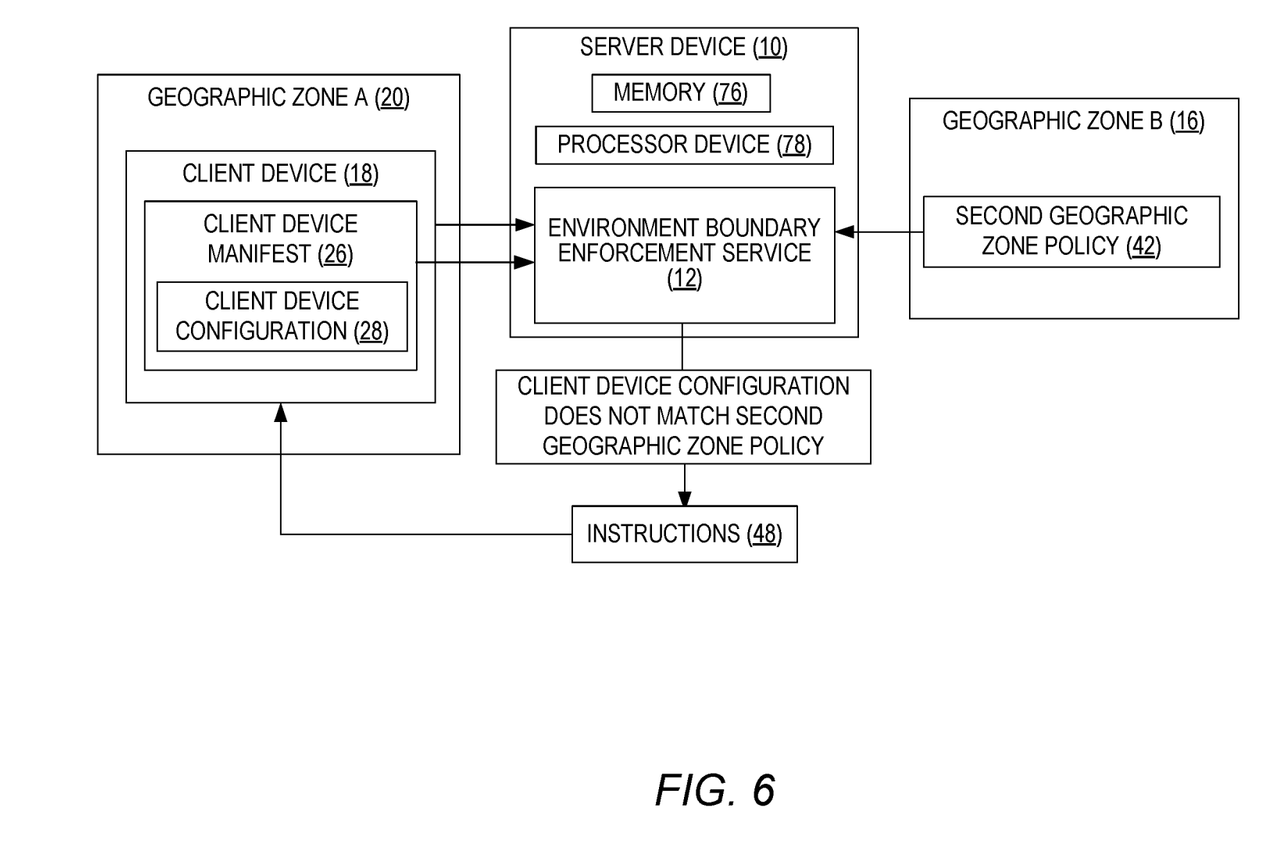
FIG. 6 is a simpler block diagram of the server device of FIG. 1 for a cluster boundary enforcer service, according to one example.

FIG. 6 is a simpler block diagram of the server device of FIG. 1 for a cluster boundary enforcer service, according to one example. Elements of FIG. 1 are referenced in describing FIG. 6 for the sake of clarity. In the example of FIG. 6, the server device 10 includes the environment boundary enforcement service 12, a system memory 76, and a processor device 78 coupled to the system memory 76. The processor device 78 is to determine that the client device 18 is transitioning from the first geographic zone 20 to the second geographic zone 16. The processor device 78 is further to receive the client device manifest 26 that identifies the client device configuration 28. The processor device 78 is further to determine that the client device configuration 28 does not match the second geographic zone policy 42. The processor device 78 is further to send instructions 48 that, if performed by the client device 18, will cause the client device configuration 28 to match the second geographic zone policy 42.

Figure 7:
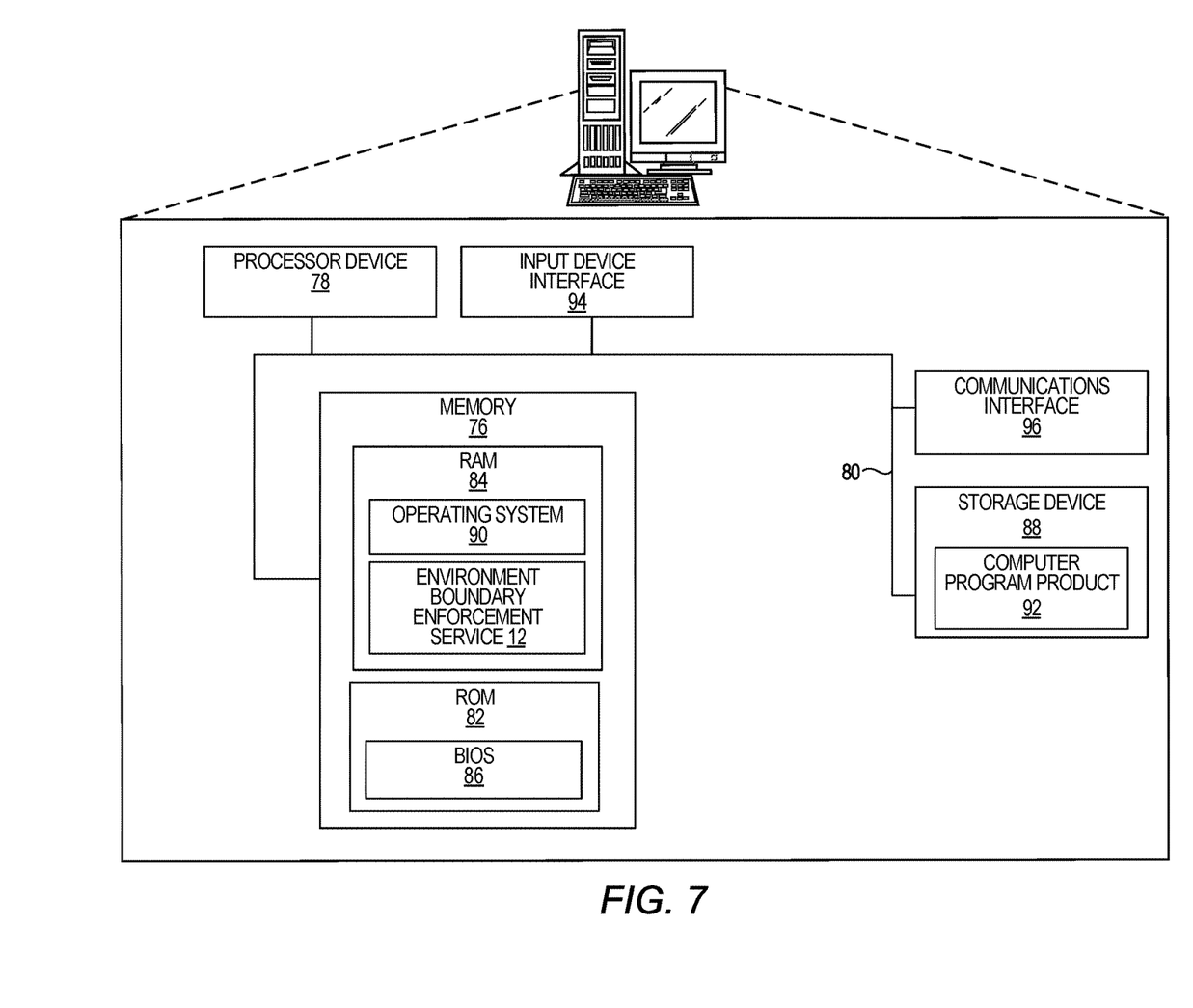
FIG. 7 is a block diagram of a server device suitable for implementing examples, according to one example.

FIG. 7 is a block diagram of the server device 10 suitable for implementing examples according to one example. The server device 10 may comprise any computing or electronic device capable of including firmware, hardware, and/or executing software instructions to implement the functionality described herein. The server device 10 includes the processor device 78, the system memory 76, and a system bus 80. The system bus 80 provides an interface for system components including, but not limited to, the system memory 76 and the processor device 78. The processor device 78 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The system memory 76 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the server device 10. The volatile memory 84 may also include a high-speed RAM, such as static RAM, for caching data.

The server device 10 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 84, including an operating system 90 and one or more program modules, such as the environment boundary enforcement service 12, which may implement the functionality described herein in whole or in part. All or a portion of the examples may be implemented as a computer program product 92 stored on a transitory or non-transitory computer-usable or computer-readable storage medium, such as the storage device 88, which includes complex programming instructions, such as complex computer-readable program code, to cause the processor device 78 to carry out the steps described herein. Thus, the computer-readable program code can comprise software instructions for implementing the functionality of the examples described herein when executed on the processor device 78. The processor device 78, in conjunction with the environment boundary enforcement service 12 in the volatile memory 84, may serve as a controller, or control system, for the server device 10 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 78 through an input device interface 94 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like. The server device 10 may also include a communications interface 96 suitable for communicating with the network as appropriate or desired. The server device 10 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a server device that is configured to provide service to client devices in a second geographic zone, that a client device is transitioning from a first geographic zone to the second geographic zone;
   receiving, by the server device, a client device manifest that identifies a configuration of the client device;
   determining, by the server device based on the client device manifest, that the configuration of the client device does not match a policy of the second geographic zone; and
   sending, by the server device to the client device, instructions that, if performed by the client device, will cause the configuration of the client device to match the policy of the second geographic zone.

2. The method of claim 1, further comprising:
   determining, by the server device, that permissions of the client device do not correspond to security policies of the second geographic zone; and
   denying the client device access in the second geographic zone.

3. The method of claim 1, wherein determining that the client device is transitioning from the first geographic zone to the second geographic zone comprises receiving, by the server device from the client device, a request to transition from the first geographic zone to the second geographic zone.

4. The method of claim 1, wherein determining that the client device is transitioning from the first geographic zone to the second geographic zone comprises:
   tracking, by the server device, a direction of the client device; and
   determining, by the server device based on a current location and the direction of the client device, that the client device is preparing to transition from the first geographic zone to the second geographic zone.

5. The method of claim 1, further comprising:
   validating, by the server device, that the client device manifest correctly identifies the configuration of the client device;
   sending, by the server device to the client device, a communication that the client device manifest is accurate; and
   accepting the client device manifest.

6. The method of claim 1, wherein the client device manifest identifies one or more of a network configuration, a capabilities status, a firmware configuration, a software configuration, a MAC address, and an IP address of the client device.

7. The method of claim 1, wherein determining that the configuration of the client device does not match the policy of the second geographic zone comprises evaluating, by the server device, differences between the client device manifest and the policy of the second geographic zone.

8. The method of claim 1, wherein the policy of the second geographic zone comprises a set of rules that govern entry and participation of the client device in the second geographic zone.

9. The method of claim 1, wherein the policy of the second geographic zone comprises a network configuration of the second geographic zone.

10. The method of claim 1, wherein sending the instructions to the client device comprises sending, from the server device to the client device, metadata comprising one or more of a local package update location, cryptographic keys, and data deletion policies.

11. The method of claim 1, wherein the instructions identify a component to be removed from the client device for entry into the second geographic zone.

12. The method of claim 1, wherein the instructions identify a configuration of the client device to be changed for entry into the second geographic zone.

13. The method of claim 1, further comprising:
receiving, by the server device from the client device, a request for a service; and
in response, providing the service to the client device.

14. The method of claim 1, further comprising:
receiving, by the client device from the server device, a request to remove a component from the client device; and
in response, removing, by the client device, the component from the client device.

15. The method of claim 1, further comprising:
subsequent to sending the instructions to the client device, receiving, by the server device from the client device, an updated client device manifest;
determining, by the server device, that the updated client device manifest matches the policy of the second geographic zone; and
sending, by the server device to the client device, a communication that the updated client device manifest matches the policy of the second geographic zone.

16. The method of claim 1, further comprising:
providing, by the server device to the client device, an application programming interface (API);
determining that a prospective service or computing device is transitioning from the first geographic zone to the second geographic zone; and
allowing the prospective service or computing device to interface with the API, wherein interfacing with the API comprises determining that the prospective service or computing device does or does not meet requirements for entry into the second geographic zone.

17. The method of claim 1, further comprising:
determining, by the server device based on the client device manifest, that the configuration of the client device matches the policy of the second geographic zone; and
in response to determining that the configuration of the client device matches the policy of the second geographic zone, providing the client device with service in the second geographic zone.

18. The method of claim 1, further comprising:
sending, by the server device to the client device, an indication that the client device is not compliant with the policy of the second geographic zone; and
denying the client device access in the second geographic zone.

19. A server device, comprising:
a memory; and
a processor device coupled to the memory, the processor device to:
determine that a client device is transitioning from a first geographic zone to a second geographic zone;
receive a client device manifest that identifies a configuration of the client device;
determine that the configuration of the client device does not match a policy of the second geographic zone; and
send instructions that, if performed by the client device, will cause the configuration of the client device to match the policy of the second geographic zone.

20. A non-transitory computer-readable storage medium that includes computer-executable instructions that, when executed, cause one or more processor devices of a server device to:
determine that a client device is transitioning from a first geographic zone to a second geographic zone;
receive a client device manifest that identifies a configuration of the client device;
determine that the configuration of the client device does not match a policy of the second geographic zone; and
send instructions that, if performed by the client device, will cause the configuration of the client device to match the policy of the second geographic zone.

* * * * *